United States Patent [19]

Su

[11] 4,269,756
[45] May 26, 1981

[54] USE OF ORGANOTITANATE IN THE ENCAPSULATION OF ELECTRICAL COMPONENTS

[75] Inventor: Tsung-Yuan Su, Greenville, S.C.

[73] Assignee: Union Carbide Corporation, New York, N.Y.

[21] Appl. No.: 107,536

[22] Filed: Dec. 27, 1979

[51] Int. Cl.$^3$ .............................................. C08L 81/04
[52] U.S. Cl. ................................................... 260/37 R
[58] Field of Search ....................... 260/37 R; 528/388

[56] References Cited

U.S. PATENT DOCUMENTS

| | | | |
|---|---|---|---|
| 4,069,192 | 1/1978 | Monte et al. | 260/37 EP |
| 4,080,353 | 3/1978 | Monte et al. | 260/40 R |
| 4,083,820 | 4/1978 | Dieck et al. | 260/37 R |
| 4,087,402 | 5/1978 | Monte et al. | 260/42.14 |
| 4,094,853 | 6/1978 | Monte et al. | 260/40 R |
| 4,096,110 | 6/1978 | Monte et al. | 260/40 R |
| 4,098,758 | 7/1978 | Monte et al. | 260/42.14 |
| 4,122,062 | 10/1978 | Monte et al. | 260/42.14 |
| 4,152,311 | 5/1979 | Monte et al. | 260/29.2 EP |

*Primary Examiner*—Lewis T. Jacobs
*Attorney, Agent, or Firm*—Frederick J. McCarthy, Jr.

[57] ABSTRACT

Encapsulation of electrical components wherein organonitrate is blended with poly(phenylene sulfide), and inorganic filler to reduce the viscosity of the blend and enable improved encapsulation.

3 Claims, No Drawings

USE OF ORGANOTITANATE IN THE ENCAPSULATION OF ELECTRICAL COMPONENTS

This invention is directed to the encapsulation of electrical components. More particularly this invention relates to a method for reducing the viscosity of encapsulating material comprising poly(phenylene sulfide) and inorganic filler.

It is well known in the art to use poly(phenylene sulfide) resin for the encapsulation of electrical components and it is also well known that the use of glass fiber or mineral fillers with poly(phenylene sulfide) together with organosilane coupling agent is particularly effective for such purpose. It is also advantageous to include polysiloxane fluid having a viscosity of about 100 to 6000 centistokes in a blend with the foregoing in amounts of about 0.5 to 2% by weight as described in my co-pending patent application Ser. No. 065,412, the disclosure of which is incorporated herein by reference. Commercially available and suitable polysiloxane fluids are Union Carbide L-45 silicone fluid and Dow Corning silicone fluid. Dow Corning 200 and 1000 are suitable poly(dimethylsiloxane) fluids; Dow Corning 510 and 710 are suitable poly(methylphenylsiloxane) fluids and are described in Dow Corning Bulletin 22-053. A commercially available poly(phenylene sulfide) material which includes organosilane coupling agent is Ryton R10. Ryton is a trademark of Phillips Petroleum Company for poly(arylene sulfide) product which is described in U.S. Pat. No. 3,354,129 and noted in U.S. Pat. No. 4,011,121 in connection with poly(p-phenylene sulfide). In the encapsulation of electrical components it is known to use Ryton R10 containing glass fiber and mineral filler and Ryton R10 7009A which further contains aminosilane coupling agent.

It is generally desirable to provide encapsulating material with relatively low viscosity in order to enable effective encapsulation of electrical components.

It is therefore an object of the present invention to provide a method for reducing the viscosity of poly(phenylene sulfide) encapsulating material.

Other objects will be apparent from the following description and claims.

A method in accordance with the present invention for making a material suitable for encapsulating electrical components comprises blending a mixture containing poly(phenylene sulfide) and glass or mineral fiber with organotitanate to provide a material to be used as an encapsulating material. The blended mixture can also contain a trimethylsiloxy end blocked polysiloxane fluid having a viscosity of about 200-1000 centistokes, i.e. silicone fluid, and organosilane coupling agent.

In the practice of the present invention a mixture containing poly(phenylene sulfide) and glass or mineral filler is blended with organotitanate, for example titanium di(cumylphenolate) oxyacetate available as KR-134S, Kenrich Petrochemicals. For example, the organotitanate can be added to a mixture of glass or mineral filler, poly(phenylene sulfide) Ryton R10 or Ryton R10 7009A containing organosilane coupling agent available from Phillips Chemical Company. The blend is used to injection mold electrical components, e.g. ceramic capacitors, using techniques well known in the art. The reduced viscosity resulting from the organotitanate addition substantially reduces the required molding temperatures and pressures and the encapsulated parts are less subject to cracking and surface blemishes.

In the practice of the present invention the range for the organotitanate addition is from about 0.5 to 5% of the weight of the inorganic fillers in the poly(phenylene sulfide) resin, preferably about 1.3% by weight; the amount of inorganic filler, e.g. glass fibers, talc, silica, being about 30-70% by weight of the poly(phenylene sulfide) resin. The fibers can, as is well known to the art, be treated with organosilane coupling agent separately or subsequent to mixing with resin. The amount and use of organosilane coupling agents is well known to the art; amounts from about 0.2 to 30% by weight of the inorganic filler are suitable. Silicone fluid as described above can be added in amounts of 0.5 to 2% by weight of the resin.

Organotitanates as used herein are chelate compounds and include those encompassed by the formula

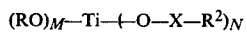

wherein
R is an acetate radical
M is 1.
N is 2.
X is a phenyl radical.
$R^2$ is a cumyl radical.

The preferred embodiment of the present invention is the addition of titanium di(cumylphenolate) oxyacetate to poly(phenylene sulfide) resin.

Other useful organotitanate compositions are diisostearoyl ethylene titanate, titanium dimethacrylate oxyacetate, titanium diacrylate oxyacetate, titanium di(dioctylphosphate) oxyacetate, di(dioctylphosphato) ethylene titanate, di(dioctylpyrophosphato)ethylene titanate. Other useful resins are substituted poly(phenylene sulfide) compositions such as poly(2,6-dimethylphenylene sulfide), poly(2,6-diethylphenylene sulfide), poly(2,6-dibromophenylene sulfide).

The following Examples will further illustrate the present invention.

EXAMPLE I

Blends of 35% by weight poly(phenylene sulfide) and 65% by weight of glass fiber, talc filler (5:3) (Ryton R10) were tumble dry blended with various additions of titanium di(cumylphenolate) oxyacetate (KR-134S-Kenrich Petrochemicals) predissolved in methylene chloride. The blended mixtures were air dried for two hours under a vented hood to remove the methylene chloride and viscosities of the various blended mixtures were measured. The results are shown in Table I.

TABLE I

| Wt.%<br>Organotitanate | Melt Viscosity<br>at 600° F., Kpoise |
|---|---|
| 0 | 38.0 |
| 0.66 | 17.64 |
| 1.33 | 10.01 |
| 3.3 | 7.95 |

*based on inorganic filler weight.

EXAMPLE II

A blend of 35% by weight poly(phenylene sulfide) and 65% by weight of glass fiber, talc filler (5:3) (Ryton R10) was tumble dry blended for one hour with 1.3% by weight (based on filler weight) of titanium di(cumylphenolate) oxyacetate (KR-134S, Kenrich Petrochemicals) predissolved in methylene chloride as a 3% solution. The blended mixture was air dried for two hours under a vented hood to remove the methylene chloride. The resulting blend was used to conventionally encapsulate ceramic capacitors using a Newbury Eldorado Reciprocating Screw Plastic Injection Molding Machine Model VI-75 ARS (Newbury Industries Inc.). The capacitors before encapsulation had dimensions of 0.180×0.130×0.030 inch. The encapsulated capacitors had dimensions of 0.300×0.300×0.100 inch.

The procedure was repeated except that organotitanate was not used. The injection molding parameters achieved for each procedure is shown in the following Table II:

TABLE II

| | Optimum Operating Conditions for: | |
|---|---|---|
| Molding Conditions | Control-Untreated Ryton R10 | Organotitanate Treated Ryton R10 |
| Hopper drying time at 250° F.: | 2 | 2 |
| Rear zone temperature: | 640° F. | 620° F. |
| Front zone temperature: | 655° F. | 630° F. |
| Nozzle temperature: | 665° F. | 640° F. |
| Mold temperature: | 125° C. | 125° C. |
| Initial injection pressure: | 1300psi | 700psi |
| Overall Injection time: | 5 sec. | 5 sec. |
| Initial injection time: | N.A. | N.A. |
| Injection rate: | 3 (press setting) | 4 (press setting) |
| Knockout time: | Max. (press setting) | Max. (press setting) |
| Screw speed | 3 (press setting) | 3 (press setting) |
| Screw back pressure: | 200psi | 200psi |
| Cycle time: | 25 sec. | 25 sec. |

The use of organotitanate treated Ryton R10 which provided reduced viscosity substantially lowered the required injection temperatures and pressure and also resulted in improved encapsulated component quality, such as much less insert cracking, fewer "show-throughs" of the inserts, and fewer surface blemishes.

What is claimed is:

1. A method of making a material for use in the encapsulation of electrical components by making a blend consisting essentially of poly(phenylene sulfide), about 30 to 70% by weight of inorganic filler and organotitanate in an amount of from about 0.5 to 5% by weight of the inorganic filler in the blend.

2. The improved method in accordance with claim 1 wherein the amount of organotitanate is 1.3% by weight of the inorganic filler in the resin.

3. The improved method in accordance with claim 1 wherein the organotitanate is titanium di(cumylphenolate) oxyacetate.

* * * * *